Aug. 11, 1959   A. G. THOMAS   2,898,905
COOKING DEVICE
Filed April 17, 1957
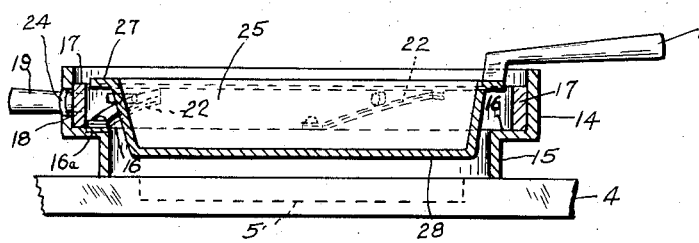
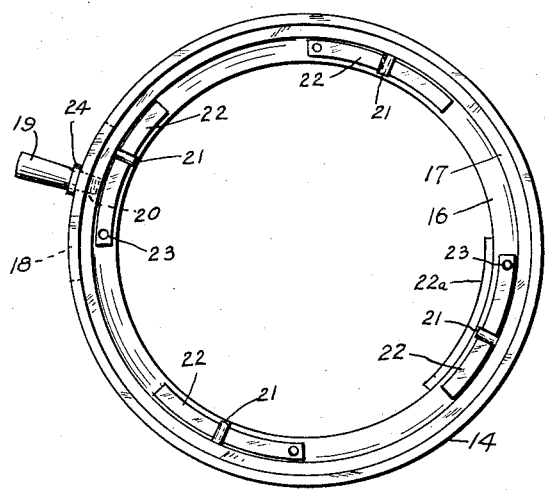
Albert G. Thomas
INVENTOR.

United States Patent Office 2,898,905
Patented Aug. 11, 1959

2,898,905

COOKING DEVICE

Albert G. Thomas, Charlottesville, Va.

Application April 17, 1957, Serial No. 653,319

2 Claims. (Cl. 126—374)

This invention relates to cooking pans, cooking vessels or utensils, or the like.

In cooking it is often desired to use a hot pan or other utensil at first and then to reduce the temperature of the pan rapidly in order to prevent burning or scorching of the food, or, to store it for a period so that it will remain warm but will not become over-cooked. In scrambling eggs, for instance, it is best to have the pan hot enough but not too hot and this intermediate temperature state is difficult to attain with electric ranges particularly. Quite often if an electric heating unit is sufficiently hot to scramble eggs properly it will soon burn them and if the heating unit is set for a lower temperature the time required to cook the eggs is often excessive. In addition, the heating units are slow to change from one temperature to another and pans or other cooking vessels or devices store a considerable amount of heat which may cause over-cooking. While the cooking of eggs has been cited as an example, the same condition holds for many other foods which are cooked in frying pans, pots, vessels, or on flat plates or other devices.

In order to overcome these and other objections to prior cooking practice or devices, I have as an object the provision of a novel cooking pan, utensil, member, or vessel, which can be quickly moved relative to a heating unit or other heat source in order to control the temperature of the pan and food.

Another object is to provide a cooking pan or vessel which can readily be made, used, and cleaned.

A further object is to provide a cooking pan or utensil which can be detached from a stand which will support the pan at various levels above or below a heating unit. The same principles can be applied to provide variation of distance horizontally as in a toaster, for instance.

An additional object is to provide a cooking pan or vessel having attached members which may be readily adjusted to hold the pan or vessel a desired distance above a support.

Another object is to provide means including heat responsive means for maintaining a cooking pan or vessel substantially at predetermined temperature by varying its distance of separation from a source of heat.

Other objects will be apparent in the following description.

In the drawings:

Figure 1 is a part sectional elevation of a heat-regulated cooking pan holder in combination with a pan.

Figure 2 is a plan view of the pan holder of Figure 1, with the pan removed.

In Figure 1, outer casing, shell, or ring 14 has reduced lower portion 15, forming annular shelf 16 on which inner ring 17 is rotatable. Casing 14 has elongated slot 18 through which a reduced portion 20 of handle 19 is passed. This end portion 20 is threaded and is screwed into a threaded hole in ring 17 to which a plurality of inwardly projecting pins 21 are screwed or otherwise attached, as by riveting or welding. Each pin 21 is placed above a bimetal element 22 fastened to heat insulation material 16a which is cemented or otherwise attached to shelf 16. The bimetal elements may be attached by rivets 23 which may be heat insulated. Handle 19 has flange 24 which is adapted to strike member 14 and to lock ring 17 in predetermined position when the handle is turned sufficiently by screwing element 20 into the associated threaded hole. A suitable temperature scale may be placed to indicate various temperatures of pan 25 for different positions of handle 19.

Pan 25 has handle 26 and flange 27 which is adapted to rest on the upper ends of inclined bimetal or other heat responsive elements 22. The outer diameter of the flange is preferably less than the inner diameter of ring 17 but this relationship is not essential.

In operation, pan 25 is placed in the device above heating unit 5 with flange 27 being supported by bimetal elements 22 unless the pan rests on unit 5. Then handle 19 is shifted with respect to slot 18 and relative to a temperature or heat indicator until the desired setting is reached. Then handle 19 may be turned to lock the temperature setting if desired. If pan 25 is cold the bimetal elements will bend down to allow the pan bottom 28 to touch heating element 5 or approximately so, and the bimetal elements will absorb heat from the heated pan and so will bend upward to lift the pan away from the heating element until the desired heating is obtained, as determined by the setting of handle 19 which, in turn, rotates ring 17 and attached pins 21 which press the bimetal elements in downward direction as handle 19 is turned in clockwise direction as seen in Figure 2. Therefore as ring 17 and pins 21 are rotated more in clockwise direction, a higher temperature of pan 25 will be necessary in order for pan bottom 28 to be maintained a predetermined distance from heating unit 5. Suitable baffles, guards, or other elements of metal, ceramics, asbestos, or other heat insulation material, like curved element 22a attached to element 15 and extending upward, may be placed near bimetal elements 22 to shield them from the direct heat from element 5. The shelf 16 also acts as a heat barrier and the pan 25 likewise acts as a direct heat shield. The bimetal elements 22 may be fastened to asbestos, glass, or other heat insulation material 16a attached to shelf 16 rather than directly to the shelf as shown. In this way a larger part of the heating of the bimetal elements will come from the pan itself. It is preferable that casing 15 be of larger diameter than that of heating element 5 in order further to remove the direct heating effect.

It is obvious that other types of heat responsive elements may be substituted for the bimetal elements 22 which are shown as curved in conformity with the shape of the device. This automatic device may be set to hold the pan in any desired temperature range.

It is obvious that the actual details of construction can be widely varied without departing from the general principles I have disclosed.

What I claim is:

1. In a cooking device, a shell-like member, heat-responsive means associated therewith and adapted to support a cooking utensil, and heat-insulation means separating said heat-responsive means from said shell-like member and attached thereto, said heat responsive means being adapted to receive heat from said utensil and to lift said utensil in accordance with the degree of heat received.

2. In a cooking device, a generally cylindrically shaped member adapted to be supported on a surface of a stove adjacent a heating element thereof, a ring member rotatable within said cylindrically shaped member, a plurality of heat responsive elements attached to said cylindrically shaped member and adapted to support a cooking utensil at various elevations with respect to said heating element, means attached to said ring member for varying the settings of said heat responsive elements as a result of rotation of said ring member, and means for rotating said ring member.

References Cited in the file of this patent

UNITED STATES PATENTS

| | | |
|---|---|---|
| 630,317 | Berg | Aug. 8, 1899 |
| 990,102 | Brewer | Apr. 18, 1911 |
| 2,782,782 | Taylor | Feb. 26, 1957 |